Patented May 21, 1935

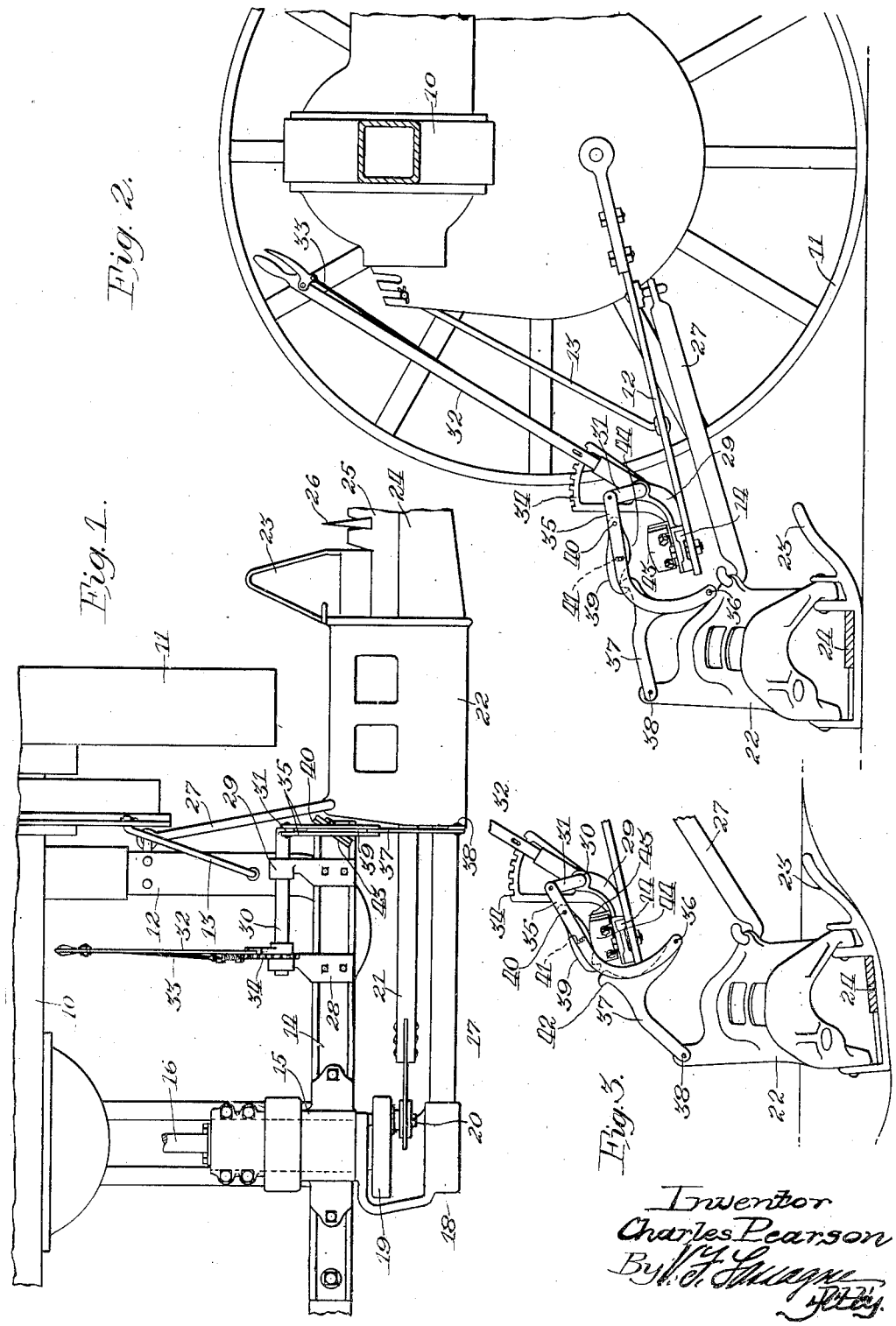

2,002,275

UNITED STATES PATENT OFFICE 2,002,275

TILTING MECHANISM FOR MOWERS

Charles Pearson, Waverly, Fla., assignor to International Harvester Company, a corporation of New Jersey Application February 14, 1934, Serial No. 711,215

8 Claims. (Cl. 56—25)

The invention relates to mowers.

These machines embody a frame and a cutter bar connected thereto by means of a yoke and coupling arm. The cutter bar must be manually tiltable to enable the operator to ride the bar over minor field obstructions without causing the cutting mechanism to be damaged. For enabling the bar to operate on land having ridges or ditches, it is desirable to have means permitting an automatic tilt of the bar whenever it drops below the normal ground line or below a predetermined operating position, so that the guards on the bar will not dig in and cause damage to the cutter bar.

More particularly, then, the invention relates to a mower having such an automatically acting tilting mechanism.

The objects of the invention are to provide an improved tilting mechanism for the cutter bar of a mower; to provide such mechanism functioning automatically when required and to work independently of the usual hand lever mechanism provided to tilt the bar, such automatically acting means being additional to the hand means; and, to provide such means operative when the coupling arm and bar drop below the normal level of operation for the cutter bar.

Such objects may be achieved, for example, in a mower having a supporting frame to which is pivotally connected a coupling arm in turn tiltably carrying the usual coupling yoke and cutter bar. A hand tilt lever is provided having a normally rigid connection of normally fixed length to tilt the bar and yoke upon manipulation of the lever. Said connection, however, is capable of being made non-rigid, or to become unlocked when the coupling arm and bar drop below the normal operating level, thus causing the connection temporarily to elongate to allow the cutter bar to tilt automatically, and independently of the hand lever. The bar can then ride easily over the ridge without having the guards dig in. When the bar levels out again at the normal level, the connection is caused to shorten up and lock itself rigidly as it was originally for normal conditions. Thus, the purpose is to utilize the dropping movement of the coupling arm, or the yoke, or the bar itself, to unlock a normally rigid connection to permit automatic tilting of the bar and, when such parts once more resume their normal level of travel, to restore said connection to its normal rigid condition.

An illustrative example of the invention appears in the accompanying sheet of drawing, in which:

Figure 1 illustrates in plan a tractor mower, selected for the disclosure, and embodying the improvements of this invention, only so much of the tractor and mower being shown as is necessary for a clear understanding;

Figure 2 is a side elevational view of part of the structure shown in Figure 1, the mower being in the normal ground line position; and, Figure 3 is another side elevational, fragmentary view, showing the mower dropped below the normal ground line with the bar automatically tilted and riding a ridge.

The tractor shown is of a well known general purpose type having a rear axle housing 10, a traction wheel 11, and drawbar 12 at its rear, which in this instance may constitute the support, or a frame, for the mower to be described.

The frame 12 is held in fixed position relative to the tractor by a hanger 13, said frame supporting a cross-plate 14 on which is centrally carried a cylindrical housing casting 15 enclosing a longitudinally disposed power take-off shaft 16 extended in the usual way from the tractor transmission.

The coupling arm of the mower is shown at 17, the same extending transversely at the rear of the frame structure just described, said coupling arm at its stubbleward end being secured in a bowl-shaped member 18 having a tubular sleeve turnably fitted into the housing 15 fixed to the frame piece 14. The coupling arm 17 can thus pivot about its stubbleward end with the part 18. This part 18 is bowl-shaped, as described, to form a protector for the flywheel 19 driven by the shaft 16, said flywheel carrying the usual eccentric wrist pin 20, to which the mower pitman 21 is connected for operating the knife in the usual way.

The grassward end of the coupling arm rockably carries the coupling yoke 22 to which a shoe 23 is pivoted in the usual way, said shoe carrying the cutter bar 24, on which is supported the knife 25 and guards 26. The lead of the cutter bar is maintained by the draw-link 27 connected between the yoke 22 and the frame 12, as shown.

A form of hand lever operated tilt mechanism for the cutter bar is provided, as follows: The frame piece 14 carries a pair of brackets 28, 29, in which is mounted a transverse rockshaft 30 having a cranked grassward end 31 adjacent the coupling yoke 22. This shaft 30 is rocked by a hand lever 32 having a conventional detent lock 33 for locking the lever and shaft in any selected set position, said detent lock 33 cooperating for such purpose with the usual form of toothed quadrant 34 carried or formed on the bracket 28.

The cranked end 31 has pivotally connected to it a pair of rearwardly and downwardly curved links 35, which are slightly spaced and coextensive, their lower, rearward ends carrying a pin 36 to which is pivotally connected an upwardly and rearwardly curved link 37, the rear end of which is pivotally connected at 38 to the yoke 22. As can be seen, the upwardly extended portion of the link 37 is sandwiched between the double link 35, said links 37, 35 in effect forming a toggle link having a break point at the pivot 36. The double link 35 carries between its sides a pivoted hook latch 39 pivoted at 40 and guided for up and down swinging movement about the pivot by a pin and slot guide 41, as shown. A hooked extension 42 extends rearwardly from the link 37, said extension or hook normally lying between the double link 35 and being engaged by the latch hook 39, as shown in Figure 2, to make the toggle link 35, 37 a rigid connection of fixed length between the crank 31 and yoke 22, so that, when the hand lever 32 is moved, the toggle link rocks the yoke 22 to tilt the cutter bar 24. The frame piece 14 carries a stop element 43 directly in line with the latch 39, and the latch at its under edge is bulged to form a shoulder 44 that is adapted to contact the stop 43 when the coupling arm 17 and mower parts carried thereby drop below the normal operating level.

For normal cutting level, the parts are as shown in Figures 1 and 2, that is, the toggle link 35, 37 is locked and rigid, so that manipulation of the hand lever 32 sets the tilt of the cutter bar as desired. The lever 32 is locked by the detent 33 and quadrant 34 to hold the bar in such set tilt. When the bar 24 and yoke 22 drop into a ground dwell, as shown in Figure 3, the coupling arm 17 pivots downwardly, so that the toggle link 35, 37 must also move down. When the shoulder 44 of the latch 39 contacts the abutment or stop 43 on the frame, the toggle is broken permitting it to elongate by spreading about its pivot 36, thus freeing the bar 24 to tilt automatically and enable it to ride freely up a ridge without causing the guards to dig in. In this condition the member 27 properly holds the yoke 22 and bar 24 against forward and downward tilting to save the guards 26 from digging in the ground. This is accomplished independently of the hand lever 32, which, of course, remains locked by the detent and quadrant. After the bar rides out of the dwell and back onto its normal lever of operation, the latch 39 engages over the hook 42 to restore the toggle link 35, 37 to its original rigid condition.

From this disclosure, it will now be apparent that the objects heretofore recited have been achieved and that the mechanism providing for the additional tilting function under abnormal ground conditions is entirely fool proof and automatic.

It is the intention to cover herein all such changes and modifications of the example herein shown which do not depart from the spirit and scope of the invention as defined in the appended claims.

What is claimed is:

1. A mower comprising a frame, a coupling arm pivotally carried by the frame, a cutter bar tiltably carried by the arm, a normally locked but releasable lever having connections to tilt the bar, and means engaging said connections to enable the bar to tilt independently of the lever when the bar drops below the normal ground line.

2. A mower comprising a frame, a coupling arm pivotally carried by the frame, a cutter bar tiltably carried by the arm, a normally locked but releasable lever having connections to tilt the bar, a stop associated with the frame, and means whereby the bar tilts automatically when the bar and arm drop below a predetermined level to cause the connections to engage said stop.

3. A mower comprising a frame, a coupling arm pivotally carried by the frame, a yoke tiltably carried on the arm, a cutter bar connected to and tiltable with the yoke, a lever, normally stiff link means connected between the lever and yoke whereby manipulation of the lever causes tilting of the yoke and bar, a stop associated with the frame, said link means embodying structure enabling the bar to tilt automatically and independently of the lever and link means when the bar drops below a predetermined level to cause said link means to engage said stop.

4. A mower comprising a frame, a coupling arm pivotally carried by the frame, a yoke tiltably carried on the arm, a cutter bar connected to and tiltable with the yoke, a lever, a toggle link connection between the lever and yoke normally locked to form a rigid connection, said toggle link serving to tilt the bar when the lever is operated, a means for unlocking the toggle link when the bar drops below a predetermined level to enable the bar to tilt independently of the lever, said toggle link locking and becoming rigid again when the bar rises to its normal level.

5. A mower comprising a supporting frame, a coupling arm pivotally connected with the frame, a yoke and cutter bar tiltably carried by the arm, a lever, a link mechanism connected between the lever and yoke whereby the lever tilts the yoke and bar when operated manually, means normally locking the lever against movement, and stop means associated with the frame and engageable with the link mechanism to enable the tilt of the bar to be augmented automatically when the cutter bar drops to a lower level than the normal ground line without unlocking the lever.

6. A mower comprising a supporting frame, a coupling arm pivotally connected with the frame, a yoke and cutter bar tiltably carried by the arm, a lever, a link mechanism connected to the lever for tilting the bar, and stop means to be engaged by the link mechanism for causing the bar to tilt automatically when the coupling arm drops with the cutter bar below a predetermined level.

7. A mower comprising a frame, a coupling arm pivotally carried by the frame, a yoke tiltably carried by the arm, a cutter bar connected to the yoke to tilt therewith, manually controlled means to tilt the bar, and stop means associated with the frame to be engaged by a part of said manually controlled means tilts automatically when the bar and coupling arm drop below a predetermined level to cause automatic tilting of the bar.

8. A mower comprising a frame, a coupling arm pivotally associated with the frame for up and down swinging movement, a cutter bar connected for tilting movement relative to the arm, means to adjust and set the bar in a selected position of tilt, and stop means associated with the frame to be engaged by the means to adjust and set the bar when the arm swings downwardly a predetermined distance to cause the bar to tilt freely.

CHARLES PEARSON.